UNITED STATES PATENT OFFICE.

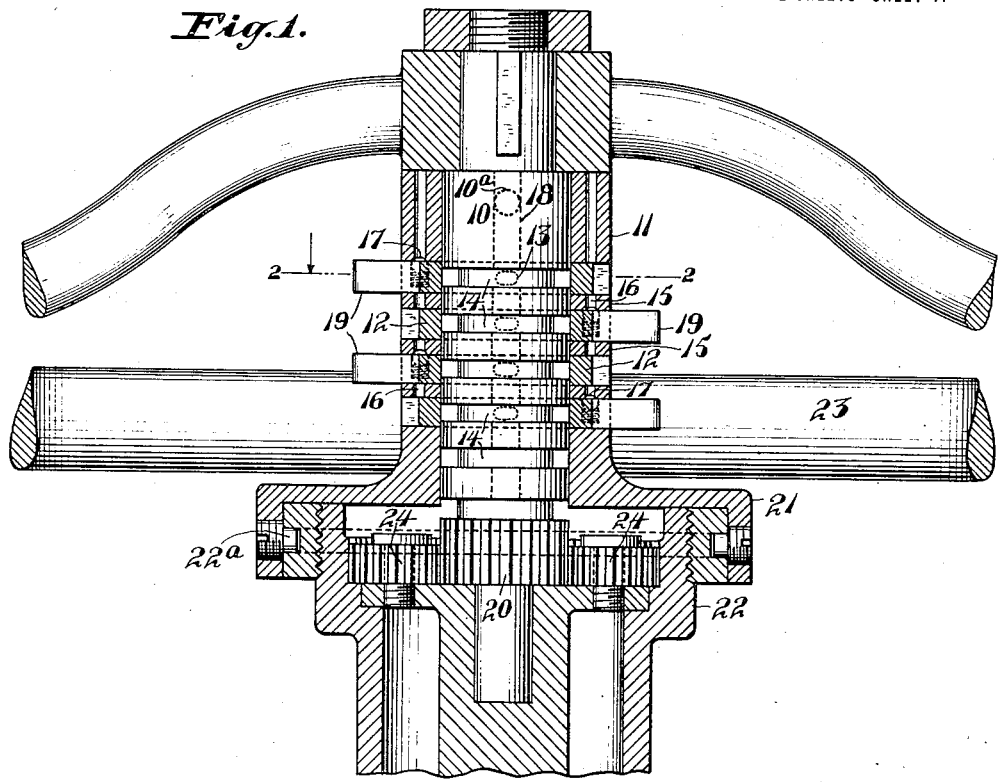
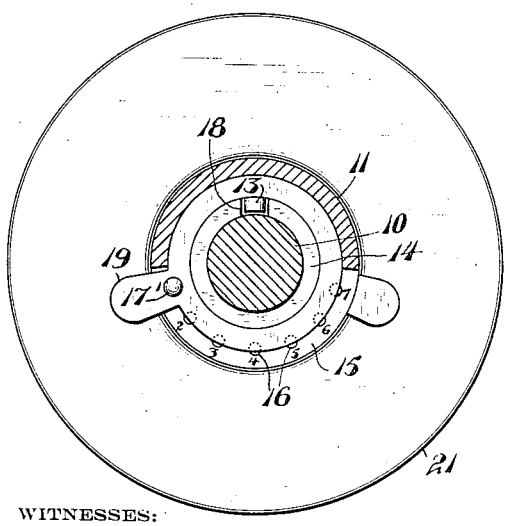
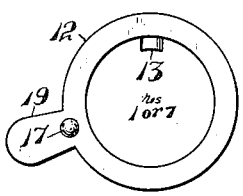
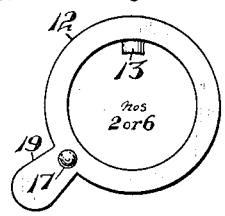
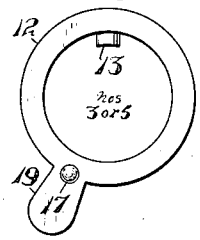
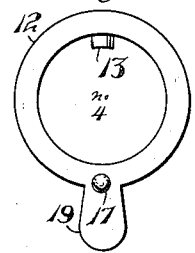

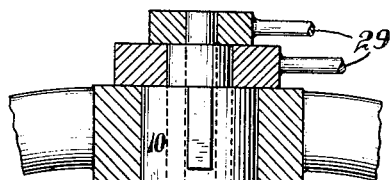
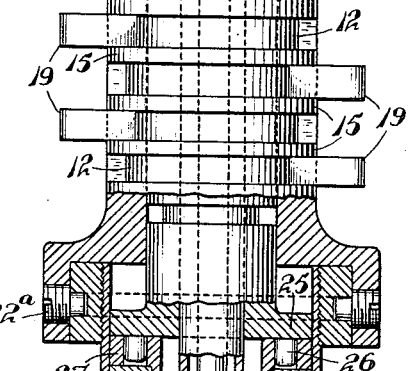
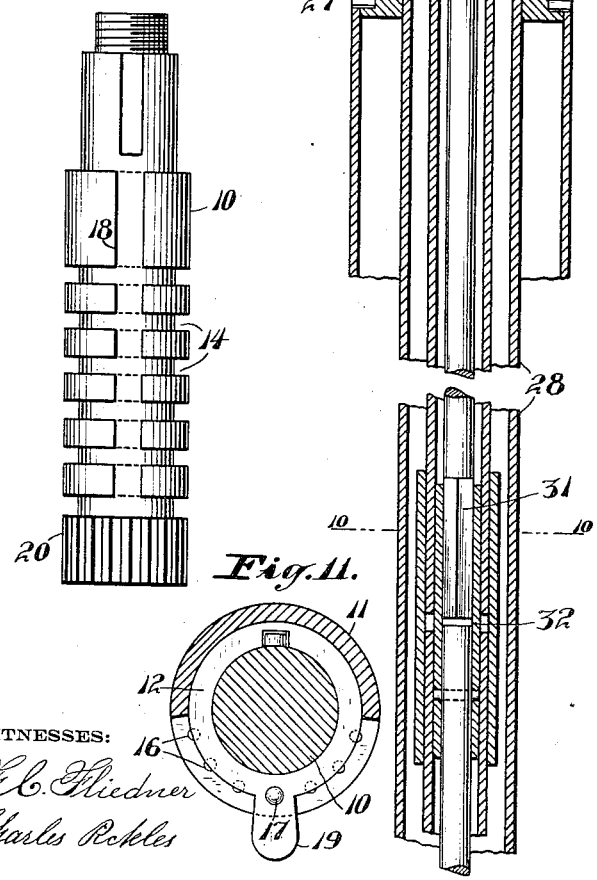
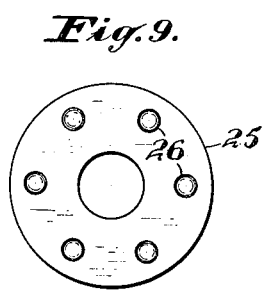
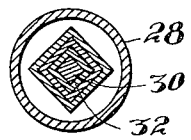

WILLIAM A. SCOTT, OF SAN FRANCISCO, CALIFORNIA.

COMBINATION-LOCK.

1,278,032.   Specification of Letters Patent.   Patented Sept. 3, 1918.

Application filed February 15, 1917. Serial No. 148,735.

*To all whom it may concern:*

Be it known that I, WILLIAM A. SCOTT, a citizen of the United States, residing at the city and county of San Francisco and State of California, have invented new and useful Improvements in Combination - Locks, of which the following is a specification.

This invention relates to combination locks; and has for its object to simplify and improve the construction and operation thereof, and more particularly to provide a lock of this character having special qualities which render it suitable for locking a shiftable steering wheel in and out of operative relation with the steering shaft or column in automobiles.

In the accompanying drawings:

Figure 1 shows a vertical, central, sectional view of a device embodying my invention applied to the steering wheel of a "Ford" automobile.

Fig. 2 shows a sectional view, taken on the line 2—2 of Fig. 1.

Figs. 3 to 6, inclusive, show the tumblers of the lock in plan.

Fig. 7 shows a side elevation of the bolt of the lock.

Fig. 8 shows a side elevation, partly in section, of my improved lock applied to an ordinary steering wheel and post, in which a special disengageable connection is employed between the wheel and shaft.

Fig. 9 shows an end view of the clutch element applied to the end of the bolt.

Fig. 10 shows a sectional view through the steering post, taken on the line 10—10 of Fig. 8.

Fig. 11 shows a modified form of connection between the tumbler and bolt.

The invention in its broad aspect comprises a bolt 10, slidable endwise in a casing 11 but held against rotation by a pin 10ª. The casing is fitted with a series of rotatable rings 12, each with one or more lugs 13 movable in an annular groove 14 on the bolt. Intermediate the rings 12 are partition members 15 on the casing 11, each with a series of apertures 16 with which coöperates a spring-pressed ball 17 on the ring, forming a yielding latch for the ring. The bolt is provided with one or more longitudinal grooves 18, corresponding in number to the number of lugs 13, which, when the lugs 13 on all of the rings are in alinement, permit the endwise movement of the bolt in the casing. The lugs 13 are differently positioned relative to the handle 19 of the ring, and there being no index plate of any kind in view, it is problematical to know when the lugs are in alinement. This alinement can be obtained only by first ascertaining the combination.

In their initial position, all of the rings are set with the handles alined at one end of their movement and each ring is then turned the required distance to bring the lugs into alinement. This distance is determined by the click of the ball in the apertures 16. The manipulation being by sound will permit the operation of the lock in the dark. By varying the relative positions of the rings and also by inverting each the combination can be changed. The total number of combinations derivable from this mechanism is represented by the number or apertures 16 raised to the power of the number of rings; in other words, with twelve rings and twelve apertures for each something in excess of eight trillion different combinations can be produced.

A modified form of the described device has lugs on the bolt in place of the longitudinal grooves and notches on the rings in place of the lugs 13, as shown in Fig. 11.

A lock so constructed and operated is especially adapted for use in connection with automobiles to lock a shiftable steering wheel in and out of operative relation with its column or shaft, inasmuch as it affords an endless variety of combinations and can readily be manipulated in the dark by reason of the audible means for indicating the distance of movement of the tumblers.

In Fig. 1 I have shown the lock applied to the steering wheel of a "Ford" automobile. In this connection the bolt 10 is utilized as the stub shaft for the center driving pinion 20 of the planetary speed reducing gearing, and a flanged portion 21, on the casing 11, provides a cover for the internal gear casing 22, being held in rotative position thereon by set-screws 22ª. The bolt 10 has the steering wheel 23 secured to it and is shiftable by lifting the wheel to withdraw the pinion carried thereby from meshing position with the planetary pinions 24. By means of the combination lock, the bolt 10 may be locked either in a raised or lowered position to permit the steering wheel to be put in and out of driving relation with the steering shaft to prevent unauthorized use of the automobile.

In Fig. 8 I show the same lock applied to an ordinary steering wheel and column, and for this purpose a special clutch device must be interposed to permit disengagement of the wheel from the column. This may take a variety of forms, and in the present instance comprises a disk 25 on one end of the bolt 10, carrying pins 26 to enter openings in a flange 27 formed on the column 28. Since ordinary steering wheels carry the spark and throttle controlling levers 29, it is necessary to provide a slide joint in the connecting shafts 30 which extends between the levers and the controlled elements. This can be done by making the shafts in two parts and squaring one end 31 and telescoping it in a squared sleeve 32 on the other part. Thus the wheel may be raised without interference from such controls.

Various changes in the construction and arrangement of the several parts herein shown and described may be employed without departing from the spirit of my invention as disclosed in the appended claims.

Having thus described my invention, what I claim and desire to secure by Letters Patent is—

1. In a permutation lock, a casing having a plurality of grooves in its inner periphery interrupted by segmental slots opening through the casing, a ring-like tumbler seated in each groove of the casing and having an operating handle extending through the respective segmental slot to permit rotation of the tumbler from the exterior, a bolt movable axially within the tumblers and formed with a plurality of connected annular grooves on its periphery, and a pin extending from each tumbler into a respective annular groove of the bolt for locking the bolt against axial movement, said tumblers being adjustable to locate the pins relative to a connecting groove on the bolt to permit of axial movement thereof.

2. In a lock, a shaft, a disengageable clutch connection between, a combination lock for retaining the clutch in and out of operative position, said lock including a bolt, a series of independently rotatable locking rings operable by hand and adapted to release the bolt when moved to a predetermined position, and audible means for indicating the distance of movement of said locking rings.

3. In a permutation lock, a casing having a plurality of grooves in its inner periphery interrupted by segmental slots opening through the casing, a ring-like tumbler seated in each groove of the casing and having an operating handle extending through the respective segmental slot to permit rotation of the tumbler from the exterior, a bolt movable axially within the tumblers and formed with a plurality of connected annular grooves on its periphery, a pin extending from each tumbler into a respective annular groove of the bolt for locking the bolt against axial movement, said tumblers being adjustable to locate the pins relative to a connecting groove on the bolt to permit of axial movement thereof.

4. In a permutation lock, a casing having a plurality of grooves in its inner periphery interrupted by segmental slots opening through the casing, a ring-like tumbler seated in each groove of the casing and having an operating handle extending through the respective segmental slot to permit rotation of the tumbler from the exterior, a bolt movable axially within the tumblers and formed with a plurality of connected annular grooves on its periphery, a pin extending from each tumbler into a respective annular groove of the bolt for locking the bolt against axial movement, said tumblers being adjustable to locate the pins relative to a connecting groove on the bolt to permit of axial movement thereof, said casing having a seat in each segmental cut-out opposing the respective tumbler, and a spring pressed catch carried by each tumbler for engaging its respective seat when its pin is properly located.

5. In a lock, a stub shaft, a spindle, a disengageable clutch mechanism between the spindle and stub shaft, a stationary casing surrounding said spindle, a casing surrounding said stub shaft and movable therewith and rotatably connected to the spindle casing, a series of circumferential depressions in said stub shaft, and a series of independently rotatable locking rings journaled in the casing of said stub shaft, each of said rings being provided with a projection to enter a depression of the stub shaft, said rings having each a handle, the handles and projections of the rings being positioned differently in relation to each other in the case of each ring and said stub shaft having a longitudinal slot which, when the projections on all the rings are in alinement, permits the shaft to be shifted endwise for engaging or disengaging the clutch connection, the shaft being held in clutched or unclutched position by disalining the projections on the rings.

6. In a lock, a stub shaft, a spindle, a disengageable clutch mechanism between the spindle and stub shaft, a stationary casing surrounding said spindle, a casing surrounding said stub shaft and movable therewith and rotatably connected to the spindle casing, a series of circumferential depressions in said stub shaft, a series of independently rotatable locking rings journaled in the casing of said stub shaft, each of said rings being provided with a projection to enter a depression in the stub shaft, said rings having each a handle, the handles and projections of the rings being positioned differently in relation to each other in the case of each ring and said stub shaft having a longitudinal slot which, when the projections on all the rings are in alinement, permits the shaft to be shifted endwise for engaging or disengaging the clutch connection, the shaft being held in clutched or unclutched position by disalining the projections on the rings, and means on the casing of the stub shaft coöperating with the rings for audibly indicating the distance of movement of the rings, whereby to permit manipulation of the combination in the dark.

In testimony whereof I have hereunto set my hand in the presence of two subscribing witnesses.

WILLIAM A. SCOTT.

Witnesses:
C. S. SINCLAIR,
J. H. HERRING.